Patented Apr. 26, 1949

2,468,330

UNITED STATES PATENT OFFICE 2,468,330

PROCESS OF BREAKING EMULSIONS

Edward L. Kropa, Old Greenwich, Conn., assignor to American Cyanamid Company, New York, N. Y., a corporation of Maine No Drawing. Application June 23, 1945, Serial No. 601,339

10 Claims. (Cl. 260—83)

This invention relates to a process for breaking emulsions wherein the emulsifying agent contains the —NH₂ group. The invention is especially adaptable for the removal of final traces of the emulsifying agent.

Emulsification is the art of dispersing a liquid in a liquid medium which is not a solvent for the liquid to be dispersed. One method of obtaining emulsions is by the use of emulsifying agents which form stable films around the dispersed globules of liquid. Of the numerous emulsifiers common to the art, the present invention relates only to those containing the —NH₂ group.

The problem of making stable emulsions is very important is many industrial operations and likewise the converse problem of breaking emulsions is of considerable importance. In many operations it is essential that all traces of the emulsifier be removed after breaking the emulsion.

Emulsion polymerization is an art which has extensive utility and frequently the emulsifying agents employed are those which contain the —NH₂ group. Some of the compounds which undergo polymerization or copolymerization in the presence of emulsifying agents of the type herein described are: butadiene, isoprene, piperylene, β-myrcene, styrene, acrylonitrile, acrylic esters and the like. Among the emulsifiers falling within the scope of the present invention are: stearamide, ethanolamine salts of dialkyl sulfosuccinic acid, ethanolamine oleate, ethanolamine laurate, and salts of octylamine, dodecylamine, tetradecylamine, octadecylamine, such as the hydrochlorides, toluene sulfonates, acetates, formates and the like.

Unsaturated compounds such as listed above readily polymerize in a dispersed state. For example, styrene is efficiently polymerized by first causing an emulsion to form by the use of dodecylamine hydrochloride. The polymer can be coagulated or precipitated from the dispersion medium by numerous demulsifying agents known in the art. In many instances final traces of the emulsifying agents are difficult to remove from the polymeric substances by commonly used methods such as steam distillation or washing with solvents, giving rise to numerous difficulties. When polymers or copolymers undergo curing at elevated temperatures, the minute traces of the —NH₂ containing emulsifiers undergo decomposition to cause opaqueness and discoloration when a clear product is desired. Many fibrous materials are treated by depositing polymeric products from emulsions followed by steaming the coated or impregnated fibers to effect a curing. When such materials are subjected to a steaming process, the presence of mere traces of emulsifying agents in the polymeric product effects a remulsification which results in an unequal distribution of the polymer on the fibrous material. In other cases, after the deposition of polymeric products upon the fibrous materials, curing is accomplished by subjecting the materials to elevated temperatures. In this case, minute traces of emulsifiers containing the —NH₂ group undergo decomposition accompanied by discoloration of the material being treated. Many of the amines are utilized as emulsifying agents in the form of their salts, for example R—NH₂·HCl, which gives rise to imparting further undesirable properties to products containing them in even small traces. When polymeric resins are used in molding such products as housings for electrical circuits the molded products are required to be good insulators and traces of emulsifying agents often defeat the attempt to attain this property of non-conductance. The voluminous manufacture of synthetic rubber is also carried out by means of emulsion polymerization and when the products are directed for certain special uses such as where good electrical properties are desired, the properties can be enhanced by the elimination of traces of emulsifiers of the type herein described. It is apparent that a convenient method for the removal of the impurities which are in the form of emulsifying agents is desirable.

An object of this invention is to provide a novel process for breaking emulsions.

Another object is to remove final traces of emulsifying agents from resinous compositions.

A further object is to improve the properties of products prepared from resinous compositions by the removal of impurities.

These and other objects are attained as disclosed herein.

The invention is especially adaptable to processes where, after demulsification by any of the numerous methods known in the art, a difficulty is experienced in the complete removal of final traces of an emulsifier having an —NH₂ group. This difficulty is eliminated by a treatment comprising the use of an alkali nitrite and an inorganic acid. When emulsifiers of the type herein described that is, emulsifiers having an —NH₂ group attached to an aliphatic carbon atom, are treated with the disclosed reagents, the following conversion takes place:

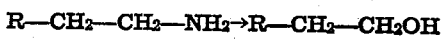

The principle of the present invention was successfully carried out as shown in the example which is given for the purpose of illustration and not in limitation. Variations may be made without departing from the spirit and scope of the invention. Unless otherwise indicated, the term "parts" is used to express parts by weight.

*Example*

An emulsion of 600 parts of styrene, 300 parts of water and 30 parts of dodecylamine hydrochloride is made. Polymerization of the styrene is brought about by heating at a temperature of about 90° C. for about 8 hours. To the dispersed polymer, 18 parts of sodium nitrite and 18 parts of concentrated hydrochloric acid are added, causing the emulsion to break followed by a coagulation of the polymer. The polymer is separated from the dispersion medium and washed with an aqueous solution containing 0.1 to 1 mol of sodium nitrite and 0.1 to 1 mol of hydrogen chloride in the form of concentrated hydrochloric acid per each mol of emulsifier originally used. The polymer is further treated with water to wash it free from inorganic salts.

A polymer obtained by the process disclosed above was molded and yielded a clear product. Polymers obtained under similar conditions without carrying out the chemical destruction of the —$NH_2$ group often give rise to opaqueness in molded products.

The amount of alkali nitrite and inorganic acid used varies with the amount of emulsifier utilized to bring about an emulsification. For example, to break an emulsion from 0.1 to 1 mol of the metallic nitrite and 0.1 to 1 mol of an inorganic acid can be used for each mol of emulsifier. To assure removal of final traces of the emulsifying agent the polymer can be separated from the dispersion medium after the coagulation and then treated again with a solution comprising about 0.1 to 1 mol of nitrite and 0.1 to 1 mol of an inorganic acid per mol of emulsifier originally used, followed by subsequent washing with water.

In place of sodium nitrite other nitrites may be used such as nitrites of potassium, lithium, and the like. Other inorganic acids may be used in place of hydrochloric, such as sulfuric, nitric and phosphoric.

I claim:

1. The method of breaking an aqueous emulsion containing (1) a polymer and (2) an emulsifier having an —$NH_2$ group attached to an aliphatic carbon atom, said method comprising treating said emulsion with an aqueous solution containing from 0.1 to 1 mol each of an alkali-metal nitrite and an inorganic acid for each mol of the emulsifier of (2) present in the said emulsion, said polymer of (1) being a product of polymerization of a polymerizable material selected from the group consisting of butadiene, isoprene, piperylene, β-myrcene, styrene, acrylonitrile and acrylic esters.

2. A method as in claim 1 wherein the alkali-metal nitrite is sodium nitrite and the inorganic acid is hydrochloric acid.

3. The method of removing final traces of an emulsifier having an —$NH_2$ group attached to an aliphatic carbon atom from a polymer which is a product of emulsion polymerization, in the presence of said emulsifier, of a polymerizable material selected from the group consisting of butadiene, isoprene, piperylene, β-myrcene, styrene, acrylonitrile and acrylic esters, said method comprising contacting said polymer with an aqueous solution of an alkali-metal nitrite and an inorganic acid.

4. The method of removing final traces of an emulsifier having an —$NH_2$ group attached to an aliphatic carbon atom from a polymer which has been formed by emulsion polymerization with the aid of said emulsifier and which is a product of polymerization of a polymerizable material selected from the group consisting of butadiene, isoprene, piperylene, β-myrcene, styrene, acrylonitrile and acrylic esters, said method comprising contacting said polymer with an aqueous solution containing from 0.1 to 1 mol each of sodium nitrite and hydrochloric acid for each mol of emulsifier originally used in the formation of said polymer.

5. The method which comprises emulsion polymerizing a polymerizable material selected from the group consisting of butadiene, isoprene, piperylene, β-myrcene, styrene, acrylonitrile and acrylic esters, said polymerizable material being dispersed in water with the aid of an emulsifying agent having an —$NH_2$ group attached to an aliphatic carbon atom, breaking the resulting aqueous emulsion of polymer by treating the same with an alkali-metal nitrite and an inorganic acid thereby to coagulate the polymer, separating the polymer from the aqueous phase, and removing the final traces of the said emulsifying agent from the said polymer by contacting the polymer with an aqueous solution containing an alkali-metal nitrite and an inorganic acid.

6. The method which comprises emulsion polymerizing a polymerizable monomeric material including styrene, said monomeric material being dispersed in water with the aid of an emulsifying agent having an —$NH_2$ group attached to an aliphatic carbon atom, breaking the resulting aqueous emulsion of polymer by treating the same with an alkali-metal nitrite and an inorganic acid thereby to coagulate the polymer, separating the polymer from the aqueous phase, and removing the final traces of the said emulsifying agent from the said polymer by washing the polymer with an aqueous solution containing an alkali-metal nitrite and an inorganic acid.

7. The method which comprises emulsion polymerizing styrene dispersed in water with the aid of an emulsifying agent having an —$NH_2$ group attached to an aliphatic carbon atom, breaking the resulting emulsion of polystyrene by treating the same with sodium nitrite and hydrochloric acid thereby to coagulate the polystyrene, separating the polystyrene from the aqueous phase, and removing the final traces of the said emulsifying agent from the said polystyrene by washing the polystyrene with an aqueous solution containing sodium nitrite and hydrochloric acid.

8. A method as in claim 7 wherein the emulsifying agent is dodecylamine hydrochloride.

9. The method of breaking an aqueous emulsion containing (1) polystyrene and (2) an emulsifier having an —$NH_2$ group attached to an aliphatic carbon atom, said method comprising contacting said emulsion with an aqueous solution containing from 0.1 to 1 mol each of an alkali-metal nitrite and an inorganic acid for each mol of the emulsifier of (2) present in the said emulsion.

10. The method of removing final traces of an emulsifier having an —$NH_2$ group attached to an aliphatic carbon atom from polystyrene formed by emulsion polymerization of monomeric styrene with the aid of said emulsifier, said method comprising contacting said polystyrene with an aqueous solution of an alkali-metal nitrite and an inorganic acid.

EDWARD L. KROPA.

REFERENCES CITED

The following references are of record in the file of this patent:

UNITED STATES PATENTS

| Number | Name | Date |
|---|---|---|
| 2,378,695 | Fryling | June 19, 1945 |
| 2,385,172 | Vanderbilt | Sept. 18, 1945 |

OTHER REFERENCES

Richter's Organic Chemistry, 1925, Spielman, 2nd. ed. vol. 1, page 163. (Aliphatic Chemistry.) Copy in Div. 50.

"An Outline of Organic Chemistry" of the College Outline Series by Degering (1939), published by Barnes and Noble of N. Y., page 144. A copy in Div. 50.

Sidgwick, Organic Chemistry of Nitrogen, pp. 19, 22, and 23, pub. 1937 by Oxford University Press. Copy in Div. 6.

Fieser and Fieser, Organic Chemistry, pp. 237, 238, 611, and 612, pub. 1944 by D. C. Heath and Co. of Boston. Copy in Div. 64.